March 4, 1969  J. HAMILTON  3,431,388
WELDING DEVICE

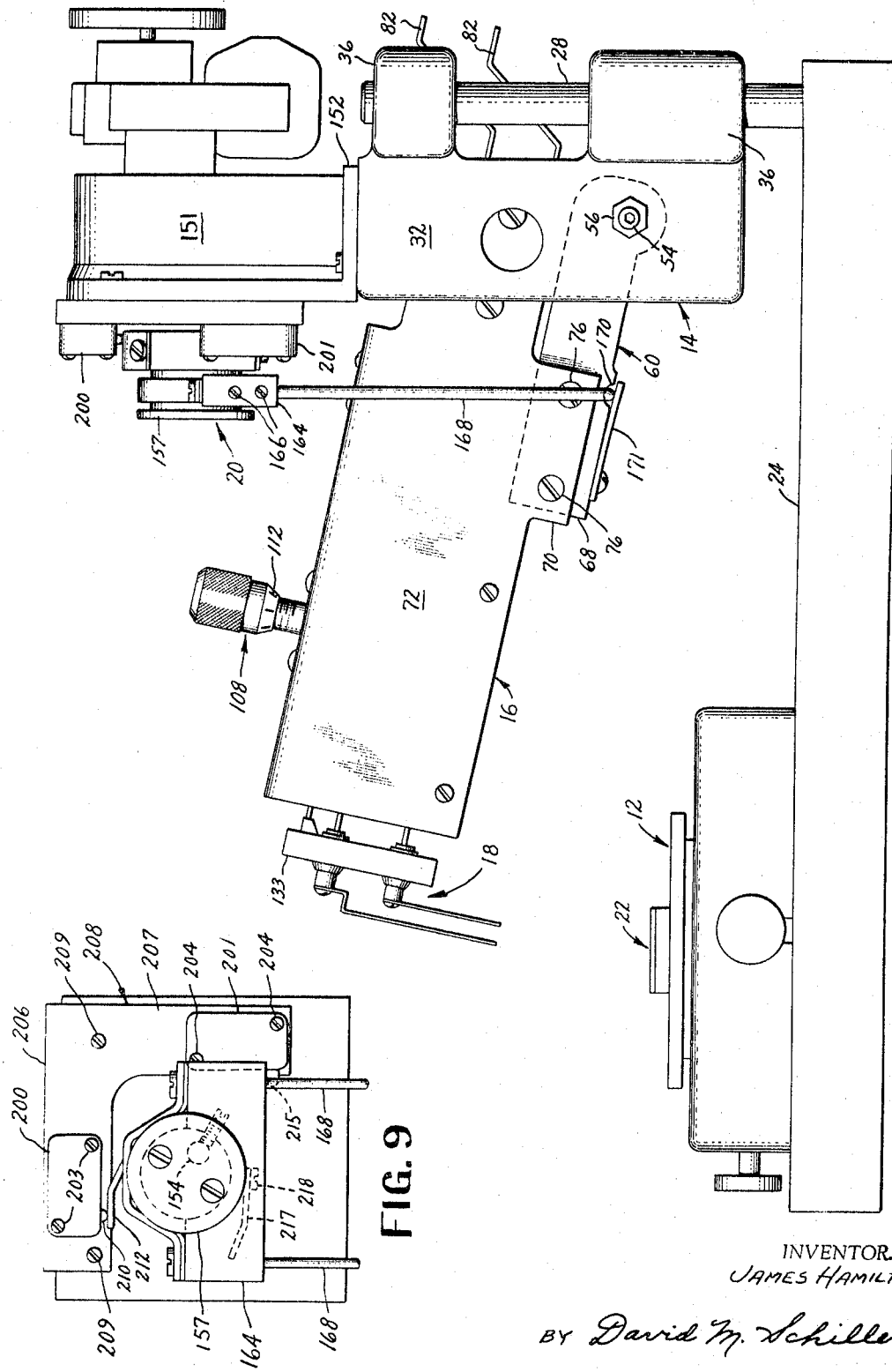

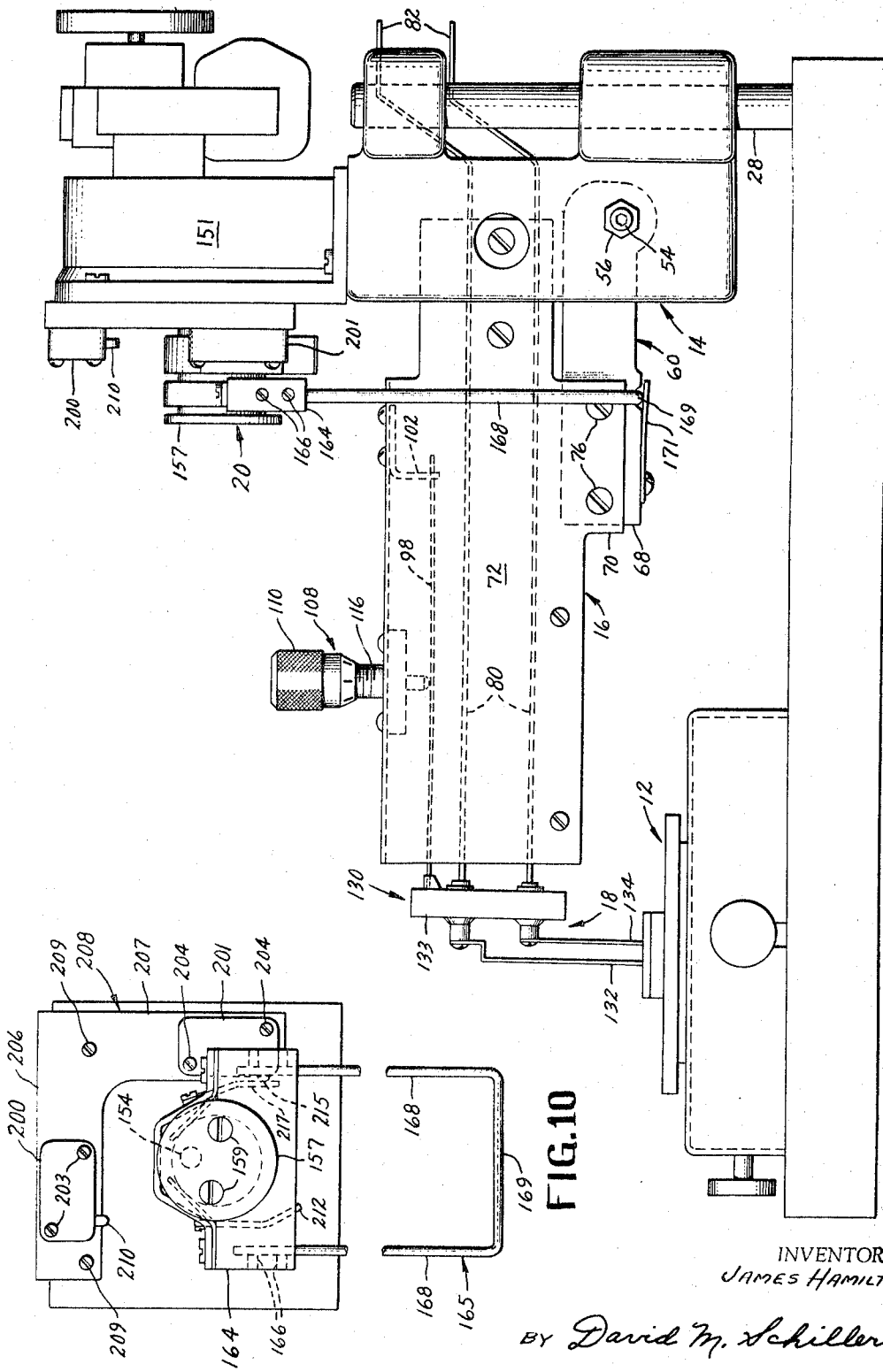

Filed Aug. 24, 1965

INVENTOR.
JAMES HAMILTON
BY David M. Schiller
ATTORNEY

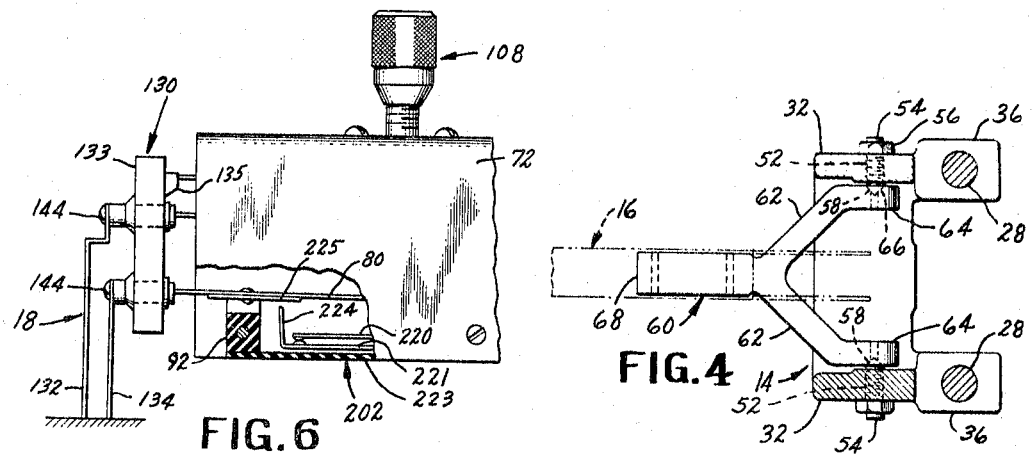
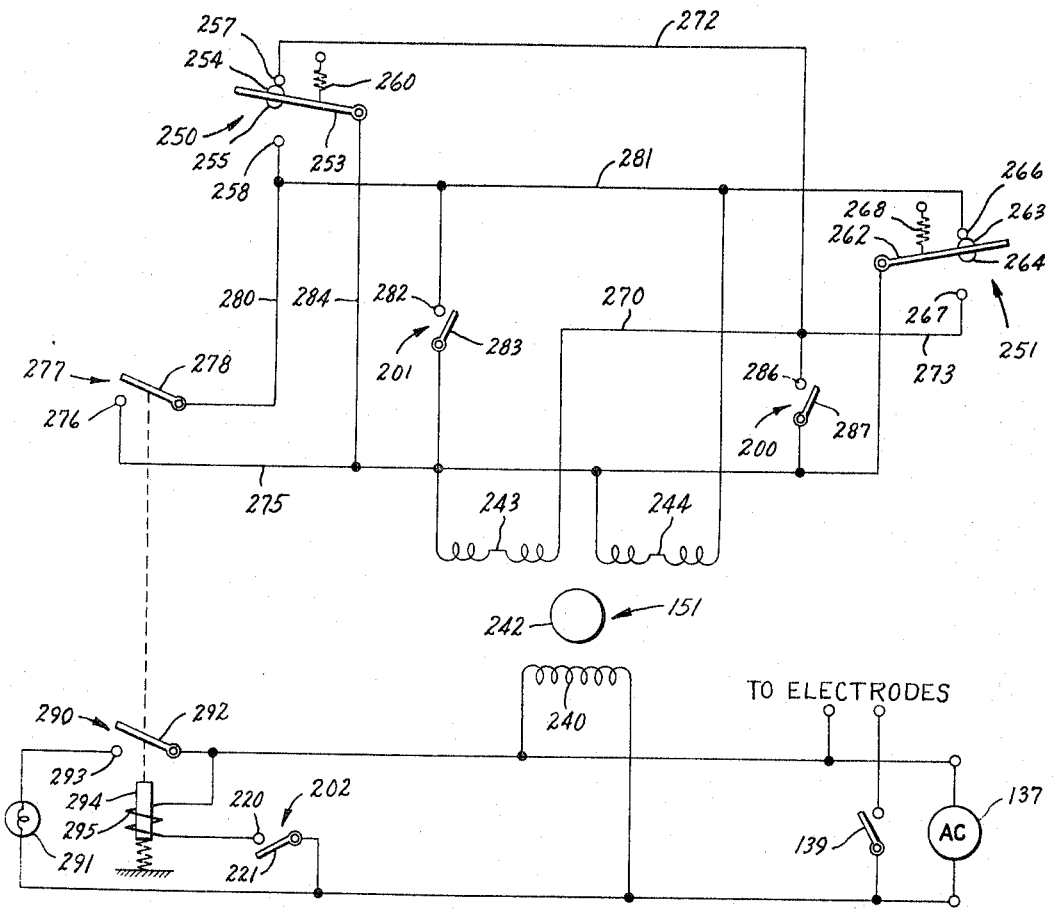

United States Patent Office 3,431,388
Patented Mar. 4, 1969

3,431,388
WELDING DEVICE
James Hamilton, Columbus, Ind., assignor to General
Electric Company, a corporation of New York
Filed Aug. 24, 1965, Ser. No. 482,203
U.S. Cl. 219—86                                16 Claims
Int. Cl. B23k 9/28, 11/10

ABSTRACT OF THE DISCLOSURE

A precision electric resistance microwelding head in which movable electrodes are accurately and rapidly moved from the rest position on to the work, and which relieves forces on the work due to expansion of the work during heating, and which accurately and conveniently applies an adjustable follow-up force to the movable electrodes when the work surface becomes plastic during the welding operation. The precision welding head includes a unique micrometer type adjustment for adjusting the force with which a preload spring urges the electrodes toward the weld position. The electrodes supporting arm is pivoted by a stirrup which is operated by a motor driven eccentric.

---

This invention relates to electric welding devices and more particularly, to precision electric resistance microwelding devices primarily suited for bonding fragile miniature components.

In the field of precision electric resistance microwelding it is desirable that a movable electrode be transportable into engagement with a fragile workpiece without the generation of damaging impact forces. It is also desirable that the movable electrode exhibit low inertia to permit free and rapid movement thereof in a direction to relieve forces resulting from expansion of the work during heating, and also to permit a subsequent rapid follow-up movement to maintain pressure on the work when the work is rendered plastic as the weld is made. Advantageously, the follow-up force should be conveniently and accurately adjustable. Previous devices have not always been adaquate in these respects, have lacked mechanical integrity to assure repetitive preciseness of the electrode positioning and follow-up force or have necessiated complex and costly arrangements which have not been entirely satisfactory.

Further, in order to accommodate workpieces of different heights and to assure proper electrode pressure on a workpiece regardless of its height, it is desirable to provide a convenient and rapid adjustment of the movable electrode welding position relative to the work and to provide drive means to effect movement of the movable electrode permitting quick termination of movement of the electrode at any position in its path of travel. Prior welding devices have frequently failed to incorporate such adjustment means or drive means capable of effecting these functions satisfactorily.

The electric welding device of U.S. Patent No. 3,351,-732 issued to C. J. Adams and assigned to the assignee of the present invention provides some of the desirable features set forth above, and the electrical welding device of this invention is an improvement over the electrical welding device revealed in that patent.

In recognition of the need for an improved precision electric resistance microwelding device, it is a general object of this invention to provide such a device that eliminates or minimizes the problems heretofore noted.

More specifically, it is an object of this invention to provide an improved welding device wherein the movable electrode is accurately and rapidly moved from its rest position onto the work without applying damaging impact forces to the work.

It is still another object of the invention to provide a welding device including an improved movable electrode structure exhibiting low inertia permitting rapid and sensitive relief and follow-up movements of the electrode.

A further object of this invention is to provide an improved welding device of low cost and compact design having provision for accurately and conveniently applying an adjustable follow-up force to the movable electrode to effect a very rapid repetitively precise follow-up movement of the electrode with the work surface as such becomes plastic during a welding operation.

It is still another object of this invention to provide a welding device including improved drive means for controlling movement of the electrode relative to the work and which is capable of very quickly terminating movement of the electrode at any position in its path of travel.

In achieving these and other object that will be apparent hereinafter, the present invention provides a welding device which is primarily suited for the bonding of miniature components. The preferred form of the device comprises a base means and arm means pivotally mounted on said base means. The arm means includes resiliently deflectable support means and electrode means are mounted on the deflectable support means. Means are provided for pivoting the arm means and the electrode means from a welding position to remote rest position. To selectively restrain the amount of deflection of the deflectable support means away from weld position, spring means are included, and to adjustably control the restraining action of the spring means, adjustment means are provided for varying the preload on the spring means.

Further, carriage means may be interposed between the base means and the arm means, the carriage means being adjustable relative to the base means to vary the location of the welding position of the electrode means.

The means for pivoting the arm means is preferably in the form of a dynamically braked reversible electric motor controlled by limit switches operated in response to arrival of the electrode means at its two extreme positions and also controlled by manually operable switches actuated by the operator.

Other objects and advantages of the invention will become apparent from the following description taken in conjunction with the accompanying drawings in which:

FIGURE 1 is a view in side elevation of a welding device constructed in accordance with the present invention and showing the electrode supporting arm assembly in its upper rest or retracted position.

FIGURE 2 is a view in side elevation similar to FIGURE 1 but showing the electrode supporting arm assembly in its lower weld position wherein the movable electrode assembly engages the work;

FIGURE 4 is a top view, partially in cross section and broken away showing a yoke for supporting the arm assembly on the carriage assembly shown in FIGURE 3;

FIGURE 6 is a side view of the outer end of the electrode supporting arm assembly shown in FIGURE 2 with parts thereof broken away for convenience in illustration;

FIGURE 9 is a front view of a portion of the drive assembly for the electrode support arm assembly shown in a position the drive assembly occupies when the arm assembly assumes the position shown in FIGURE 1;

FIGURE 10 is a front view of a portion of the drive assembly shown in FIGURE 9 but shown in a position the drive assembly occupies when the arm assembly assumes the position shown in FIGURE 2; and FIGURE 11 is a schematic diagram of the circuit utilized to control operation of the drive assembly of the device.

Figure 5:
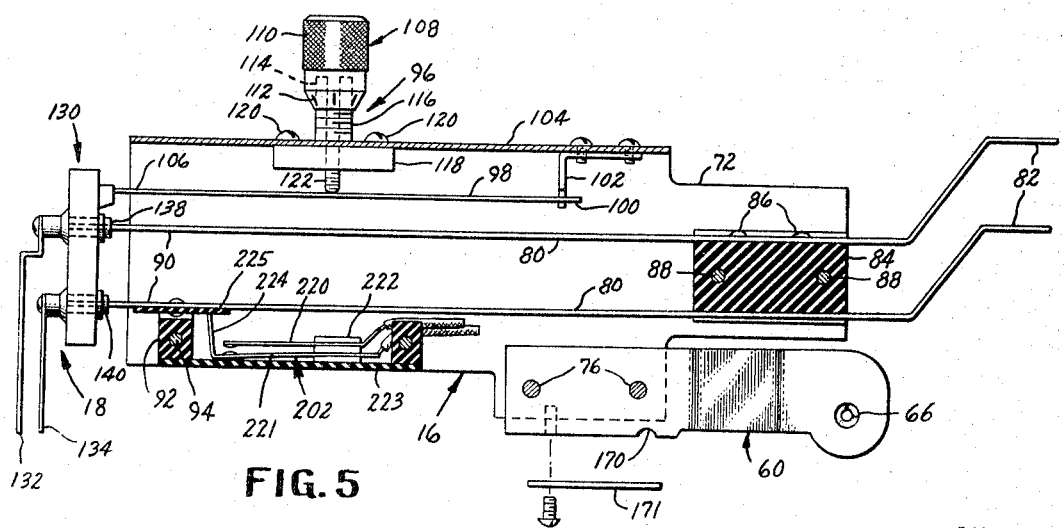
FIGURE 5 is a cross sectional side view of the electrode supporting arm assembly shown in FIGURE 1 with parts broken away shown in section.

Referring in more detail to FIGURE 1 of the drawings, a welding device according to the present invention generally comprises a base assembly 10, one end of which is provided with an anvil 12 or workpiece support of any suitable type. Vertically movably mounted on the other end of the base assembly 10 is a carriage assembly 14. An arm assembly 16 is pivotally connected at its inner end to the carriage assembly 14 and is provided with an electrode assembly 18 at its outer end. Drivingly associated with the arm assembly 16 is an electrically controlled drive motor assembly 20 which functions to pivot the arm assembly 16 from an upper rest or retracted position, as shown in FIGURE 1, to a lower weld position, as shown in FIGURE 2, wherein a workpiece 22 comprising two parts to be bonded may be lightly contacted and welded.

Figure 3:
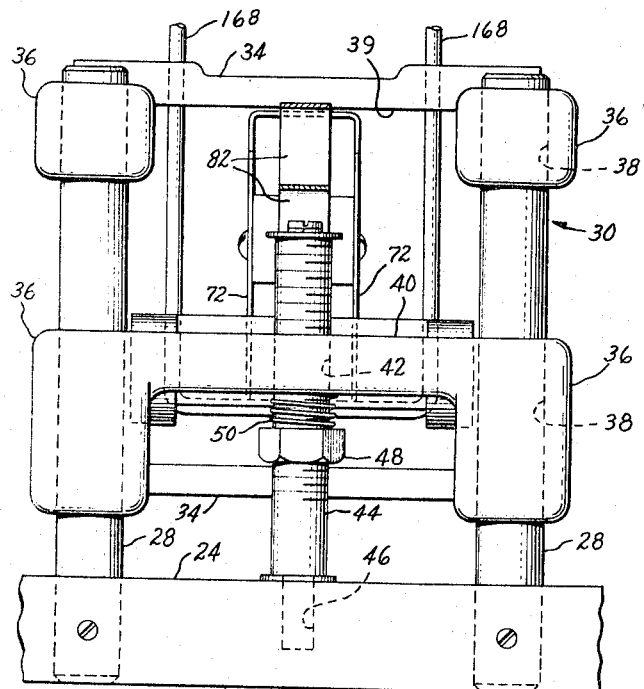
FIGURE 3 is a view in rear elevation of the device of FIGURES 1 and 2 showing the arm assembly carriage assembly with parts thereof broken away for convenience in illustration.

More specifically, the base assembly 10 includes a horizontally disposed base 24, to one end of which a pair of horizontally spaced, vertically extending, circular posts 28 are fixed, as shown in FIGURE 3.

To permit vertical adjustment of the lower end of the electrode assembly 18 in the weld position to accommodate various height workpieces, the carriage assembly 14 is vertically movably mounted on the posts 28. The carriage assembly includes a vertically extending, box-like frame 30 formed of a pair each of spaced rigidly connected vertical and horizontal legs 32 and 34, respectively. Rigidly connected on the inner face of the frame 30, at each corner thereof, is a sleeve 36 having a vertically extending cylindrical bore 38 therethrough for sliding reception of the posts 28. As best seen in FIGURE 3, the frame 30 includes a rectangular opening 39 through which an electrical connection to the electrode assembly may be directed as will appear hereinafter.

To facilitate vertical adjustment of the carriage assembly 14, a horizontally disposed, transverse leg 40 is fixed between the lower sleeves 36, the leg 40 including a vertically extending threaded bore 42 intermediate the length thereof for receiving a vertically extending threaded adjustment shaft 44, the lower end of which is of a reduced diameter and is suitably rotatably received in a bore 46 in the base 24. A nut 48 is threadedly mounted on the shaft 44 below the elevation of the transverse leg 40 and a compression spring 50 is disposed about the shaft between the upper face of the nut and the lower face of the leg. To vertically adjust the carriage assembly, the shaft is rotated to move the assembly in a vertical direction. Subsequently, the nut 48 may be appropriately adjusted, if necessary, to urge the spring 50 into contact with the lower face of the transverse leg 40 to thereby aid in maintaining the adjustment at the desired elevation and force.

To pivotally mount the arm assembly 16 on the carriage assembly 14, the vertical legs 32 of the frame 30, as shown in FIGURE 4, are each provided with a threaded, transversely extending bore 52 near the lower end thereof. Received in each bore 52 is a threaded set screw 54 on the outer end of which a threaded nut 56 is mounted. The inner end 58 of the set screw 54 is tapered. A bifurcated yoke 60 having a pair of diverging legs 62 is positioned between the vertical legs 32 of the frame 30. The legs 62 include parallel portions 64, the outboard face of which is provided with a tapered recess 66 to rotatably receive the tapered inner end 58 of each of the screws 54. In this manner, the freedom of the yoke to pivot relative to the carriage assembly 14 about the axis of the set screws 54 can be adjusted as desired by utilization of the set screws 54.

As will be seen in FIGURE 1, an outer end of a center leg 68 of the yoke 60 is fixedly received between a pair of flanges 70 projecting downwardly from a pair of elongated, spaced plates 72 defining the sides of the arm assembly 16. The flanges 70 are provided with horizontally spaced apertures for reception of suitable fasteners 76 directed through transversely disposed bores in the center leg 68 of the yoke.

To achieve an electrode suspension exhibiting very low inertia characteristic whereby rapid movement of the electrode assembly 18 away from the workpiece to relieve forces resulting from heat expansion of the workpiece is provided, as well as a subsequent rapid follow-up movement of the electrode assembly toward the workpiece when the latter is rendered plastic as the weld is made, the design of the instant arm assembly 16 is significant. Positioned between the side plates 72 of the arm assembly 16 are a pair of vertically spaced, elongated, electrically conductive resiliently deflectable flat spring members 80. The inner end 82 of each of the spring members 80 is inclined upwardly and inwardly to form a bus bar arrangement projecting through the rectangular opening in the frame 30 to be connected to a source of alternating voltage in any suitable manner.

As shown in FIGURE 5, the spring members 80 are anchored adjacent their inner ends 82 by a rectangular electrically nonconductive spacer block 84. The spacer block 84 has a rectangular recess on its upper and lower faces to receive the spring members 80 which are rigidly fixed thereto by a pair of suitable vertically extending horizontally spaced fasteners 86. To fix the block 84 between the side plates 72 of the arm assembly 16, a pair of transversely-extending horizontally spaced fasteners 88 are directed through bores in side plates 72 and the block 84.

The flat springs 80 extend in spaced relation to and between the side plates 72, the outer ends 90 of the springs 80 being fixed to the electrode assembly 18. Deflection of the flat springs 80 is limited in a downward direction by a horizontally extending stop 92 adjustably fixed between the lower, outer ends of the side plates 72 by a suitable fastener 94.

In accordance with the present invention improved means are provided for restricting upward deflection of the springs 80 and for applying an adjustable preload to the electrode means. Deflection of the flat springs 80 in an upward direction is restricted by a deflection control assembly 96 which urges the springs downwardly. The deflection control assembly comprises an elongated, flat horizontally extending, resiliently deflectable control spring 98, an inner end 100 of which is connected in spaced relation, by an L-shaped bracket 102 to an arm assembly top wall 104 fixed between the side plates 72. The control spring 98 extends in spaced relation to and between the side plates 72, above the flat springs 80, an outer end 106 of the control spring 98 being fixed to the electrode assembly 18. Intermediate the ends of the control spring 98 a micrometer-type preload adjustment assembly 108 is positioned in the top wall 104. This assembly in the illustrated embodiment includes a knurled cap or nut 110 having suitable graduated indicia 112 about the lower outer periphery thereof. The cap 110 includes a threaded bore 114 threadedly receiving a sleeve 116 fixedly mounted on the top wall 104 by a block 118 and suitable fasteners 120. The sleeve 116 includes a vertically extending bore therethrough, through which a screw 122 projects. The upper end of the screw 122 is connected to the cap 110 and the lower end thereof projects through suitable bores in the top wall 104 and the block 118 to adjustably abut an upper face of the control spring 98.

To accurately adjust the preload on the flat springs 80, the cap 110 may be selectively rotated to vertically move the screw 122 a predetermined amount thereby altering the load on the control spring 98 and consequently the preload on the flat springs 80. Because accurate adjustment is facilitated the inertia characteristics of, and the follow-up force acting upon the electrode assembly 18 may be closely governed to assure optimum efficiency in a microwelding process of fragile miniature components.

As will be apparent, the flat springs and control spring may be replaceable and selected to provide the desired spring rate or force for a specific application.

Figure 7:
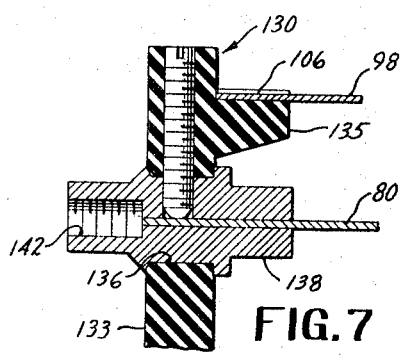
FIGURE 7 is a cross sectional, broken away side view of the electrode holder shown in FIGURES 1, 2 and 5.

The electrode assembly 18 may be of a suitable type but preferably comprises an electrode holder 130, as shown in FIGURES 6 and 7, on which are mounted a pair of electrode tips 132, 134. The electrode holder 130 includes an electrically nonconductive holder block 133 having an inwardly projecting, flattened upper shoulder 135 on its upper inner face and a pair of vertically spaced, horizontally extending bores 136 for reception of bushings 138, 140. As best seen in FIGURE 7, each bushing 138, 140 has a threaded horizontally extending bore 142 for reception of an electrically conductive screw 144 to fix an electrode tip thereto. The inner end of each bushing is connected to the outer end of one of the electrically conductive flat springs which projects therethrough to abut the inner end of one of the screws 144. Welding current follows a path which may be traced from a source 137 (FIGURE 11) to one of the inner ends 82 of the flat springs 80, through the flat springs, the associated screw 144, one of the electrode tips, the workpiece, and back through the other electrode tip, its screw and flat spring and so on. It will be appreciated that while with this arrangement welding may be performed from one side of the workpiece, the present invention includes within its scope other than single-side electrode assemblies.

Referring to FIGURE 7, the outer end 106 of the control spring 98 is fixed to the upper face of the upper shoulder 135 of the electrode holder block 133. In this manner, the control spring preload acts to resiliently urge the electrode assembly 18 downwardly. However, this arrangement exhibits low inertia characteristics and rapid upward movement of the electrode assembly away from the work to relieve forces resulting from heat expansion of the work is achieved. After deflection, the arrangement provides a rapid follow-up or downward movement of the electrode assembly to maintain pressure on the work when such is rendered plastic as the weld is made.

Figure 8:
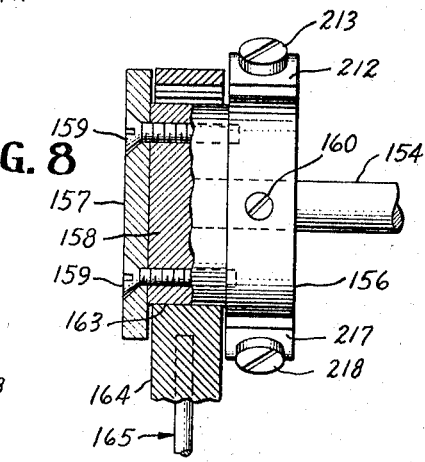
FIGURE 8 is a cross sectional, broken away side view of a portion of the drive assembly for the electrode support arm assembly shown in FIGURE 1.

In order to effect movement of the electrode assembly between its rest and weld positions, the invention provides an improved connection between the electrically controlled drive motor assembly 20 and the arm assembly 16. In the embodiment illustrated, the motor assembly comprises a dynamically braked, reversible electric motor 151 mounted on a flat base 152 secured in any suitable manner to the upper leg 34 of the frame 30. As best shown in FIGURE 8, the motor 151 includes a motor shaft 154 which extends through eccentric openings formed in a bearing 156 and in a plate 157 secured to the face of a restricted part 158 of the bearing as by screws 159. The shaft 154 is fixed to the bearing 156 by means of a screw 160 extending through the side of the bearing into engagement with the shaft. The restricted part 158 of the bearing extends loosely through an opening 163 formed in the upper end of a two-piece, removable clamp 164 from a lower end of which a U-shaped stirrup 165 is removably suspended and fixed thereto by suitable fasteners 166 for pivotally connecting the clamp 164 to the arm assembly 16. As best shown in FIGURES 9 and 10, the motor shaft 154 is parallel to and radially displaced from the center line of the bearing so that rotation of the motor shaft effects an eccentric movement of the bearing about the axis of the shaft 154, the stirrup 165 acting squarely across the underside of the arm assembly 16.

The stirrup 165 comprises a pair of vertically extending, horizontally spaced vertical legs 168 (FIGURE 10), the lower ends of which are connected by a transversely extending horizontal leg 169. The arm assembly 16 is positioned between the vertical legs 168 and a lower face of the center leg 68 of the yoke 60 and is provided with a semi-circular recess 170 which receives the horizontal leg 169 and is retained therein by a suitably secured resilient bracket 171.

The movements of the electrode assembly in response to energization of the motor will now be described. Initially, it will be assumed that the motor is deenergized and that the arm assembly 16 is in its rest position shown in FIGURE 1. If the motor is now energized in a direction to rotate the shaft 154 in a counterclockwise direction as viewed in FIGURE 9, the bearing 156 and the plate 157 will be eccentrically rotated in such counterclockwise direction about the axis of the shaft 154. Such eccentric rotation results in substantially vertical movement of the clamp 164 and the stirrup 165 downwardly which effects counterclockwise pivotal movement of the arm assembly 16 about the axis of the set screws 54 as viewed in FIGURE 1. Due to the eccentric rotation of the bearing 156, the vertical movement of the stirrup 165 is accompanied by a slight transverse shifting thereof. Such shifting is possible by virtue of the clearance between the vertical legs 168 and the side plates 72 of the arm assembly 16, as shown in FIGURE 3. Further the abutment of the resilient bracket 171 with the horizontal leg 169 does not appreciably restrict such action.

The above described pivotal movement of the arm assembly to the position shown in FIGURE 2 is effected rapidly by rotation of the motor shaft through a small fraction of a complete revolution. The freedom to pivot of the arm assembly may be controlled by adjustment of the set screws 54.

As the electrode tips 132 and 134 are brought into engagement with the upper surface of the work 22 and the motor shaft continues to rotate, the flat springs 80 are deflected upwardly as shown in FIGURE 6 to store a spring force which urges the electrodes downwardly against the workpiece which minimizes the possibility of damage thereto. The downward movement of the arm assembly and frame is terminated in a manner described hereinafter.

When the device is in the position shown in FIGURES 2 and 6 the welding operation is initiated by closure of the switch 139 which supplies current from the source 137 to the electrode tips 132 and 134. As the current heats the work, the work expands and the low inertia electrode structure is readily moved upwardly to relieve the resulting forces which might otherwise damage the delicate substrate on the workpiece. At the instant the weld is made, the upper surface of the workpiece becomes a plastic and to effect a satisfactory weld, it is necessary that the electrode tips 132 and 134 maintain adequate pressure on the workpiece. The spring force stored by the flat springs 80 as a result of their upward deflection previously described is released as the work becomes plastic to force the tips 132 and 134 downwardly against the receding material of the workpiece. In this manner a rapid follow-up force is provided to maintain adequate pressure of the electrode tips on the workpiece.

When the welding operation is completed, the motor is energized to effect rotation of its shaft in a clockwise direction as viewed in FIGURES 9 and 10 so that the above-described movements of the arm assembly and stirrup are reversed. Initially, the stirrup 165 is elevated from its position shown in FIGURE 2 to move the arm assembly 16 in a clockwise direction until it reaches its rest position at which time such movement is terminated as will be described. This then completes a full cycle of movement of the arm assembly 16.

As previously pointed out, mounting of the carriage assembly 14 on the rotatable threaded shaft 44 permits vertical adjustment of the carriage assembly relative to the base assembly 10 in response to rotation of the shaft 44. With the arrangement of parts previously described, rotation of the shaft 44 is effective to move all parts including the motor assembly 20 and the arm assembly 16 as a unit with respect to the base assembly 10. Such arrangement permits adjustment of the electrode assembly 18 vertically with respect to the base assembly 10 to accomodate workpieces of various heights while providing consistent follow-up throughout an elevational range.

A circuit arrangement is provided to control energization of the motor 151. The circuit arrangement includes a plurality of limit switches positioned for actuation in response to movements of the electrode means. In the illustrated embodiment, three limit switches 200 (FIGURE 9), 201 and 202 (FIGURE 5) are provided. The "up" and "down" limit switches 200 and 201 respectively are mounted by screws 203 and 204 on arms 206 and 207 of an L-shaped bracket 208 secured to the frame of the motor by screw 209. The switch 200 is normally closed and has a vertically reciprocable spring biased operating member 210 which is actuated upwardly by a bracket 212 fixed on the periphery of the bearing 156 by screw 213 to close the switch when the motor shaft 154 is in its position shown in FIGURE 9 corresponding to the rest position of the arm assembly 16. The switch 201 is normally open and has a horizontally reciprocable spring biased operating member 215 actuated towards the right by a bracket 217 fixed by screw 218 on the bearing to close the switch when the motor shaft 154 is displaced in a counterclockwise direction from its position shown in FIGURE 10.

The arm limit switch 202, as shown in FIGURES 5 and 6, is normally open and in accord with the present invention, comprises fixed and resilient movable contacts 220 and 221, respectively, appropriately wired and supported by a block 222 so as to urge the movable contact 221 toward a closed position. The block 222 is mounted on an arm assembly bottom wall 223 connected between the side plates 72. The movable contact is L-shaped in form and includes on its outer end a vertically extending portion 224 the upper end of which abuts the lower face of an insulator plate 225 fixed on the lower face of the lower flat spring 80, as shown in FIGURE 5, to space the contacts 220 and 221 when the arm assembly 16 is in the rest position as shown in FIGURE 1. The switch 202 at this position is maintained in the open position. However, upon upward deflection of the flat springs 80, as caused by contact of the electrode tips 132, 134 with a workpiece, the plate 225 is moved upwardly to an extent permitting movement of the contact 221 into engagement with contact 220 to close the switch 202 as shown in FIGURE 6.

The control circuit is schematically shown in FIGURE 11 and includes the motor 151 which is of the reversible shaded pole type and which is shown as comprising a field coil 240 connected across the voltage source 137 and cooperating with an armature 242 and a pair of "down" and "up" pole shading windings 243 and 244 respectively. The motor is designed to withstand continuous input electric power even in the stalled rotor condition. The several windings are arranged so that when both the poles shading windings are shorted, the armature cannot rotate. However, when the "down" winding 243 is shorted and the "up" winding 244 is open, the armature is rotated in a direction to rotate the motor shaft counterclockwise as viewed in FIGURE 9 and move the electrodes downwardly towards the workpiece. On the other hand, when the "down" winding 243 is open and the "up" winding 244 is shorted, the armature is rotated in the opposite direction to rotate the motor shaft clockwise and move the electrode means upwardly away from the workpiece. Provision of the two pole shading windings results in dynamic braking of the motor in response to shorting of both windings which is very desirable.

The open and shorted conditions of the pole shading windings 243 and 244 are controlled by a pair of manually operable single pole double throw type "up" and "down" switches 250 and 251 respectively as well as by the limit switches 200, 201 and 202. The "up" switch 250 is schematically shown in FIGURE 11 as including a manually movable contact carrier 253 having movable contacts 254 and 255 engageable respectively with spaced fixed contacts 257 and 258. The carrier 253 is formed of electroconductive material and is biased by a spring 260 so that the contacts 254 and 257 normally engage. Similarly, the "down" switch 251 includes an electroconductive carrier 262 having contacts 263 and 264 engageable respectively with spaced fixed contacts 266 and 267. A spring 268 biases the carrier 262 upwardly so that the contacts 263 and 266 normally engage. As will presently appear, when the "down" switch 251 is actuated by depressing its carrier 262, the "down" winding 243 is shorted to effect movement of the arm assembly 16 downwardly. When the carrier 253 of the "up" switch 250 is depressed to actuate the switch, the "up" winding is shorted to effect movement of the arm assembly upwardly.

Details of the circuit shown in FIGURE 11 will now be described. The "down" winding 243 has one side connected to a wire 270 which is connected to the fixed contact 257 of switch 250 through a wire 272 and which is connected to the fixed contact 267 of switch 251 through a wire 273. The other side of the "down" winding is connected to a wire 275 which leads to the carrier 262 of switch 251 and to a fixed contact 276 of a normally open switch 277 having a movable contact 278 which is moved to engage the fixed contact 276 in response to closure of the "down" limit switch 202. The movable contact 278 is connected to the fixed contact 258 of switch 250 by a wire 280. The fixed contact 258 is also connected to the fixed contact 266 of switch 251 by a wire 281. The switch 201 connected in parallel with the switch 277 for this purpose includes a fixed contact 282 connected to the wire 281 and a movable contact 283 connected to the wire 275. The carrier 253 of switch 250 is connected to the wire 275 by a wire 284. The "up" winding 244 has one side connected to the wire 275 and has its other side connected to the wire 281. The "up" limit switch 200 includes a fixed contact 286 connected to the wire 270 and a movable contact 287 connected to the wire 275. With the described arrangement the "up" limit switch 200 is connected across the "down" winding 243, and both the switches 201 and 277 are connected across the "up" winding 244.

The "arm" limit switch 202, in addition to controlling operation of the switch 277, also controls operation of a switch 290 which controls illumination of a lamp 291 connected in series with the source 137. The switches 277 and 290 are arranged to operate simultaneously in response to operation of switch 202 and for this purpose, the switch 290 includes a movable contact 292 which cooperates with a fixed contact 293 and which is mechanically connected to the movable contact 278 of switch 277 and to a magnetic armature 294 surrounded by a coil 295 which is connected between the fixed contact 220 of switch 202 and the movable contact 292 of the switch 290.

The operation of the circuit arrangement shown in FIGURE 11 may now be described. Initially, it will be assumed that the arm assembly 16 is in its upper rest position as shown in FIGURE 1. For this position of the arm assembly, the operating member 210 of the switch 200 is actuated upwardly by bracket 212 so that the contacts 286 and 287 of switch 200 normally engage to short the "down" winding 243. At this time the "down" winding 243 is also shorted through another path including the normally closed contacts 254 and 257 of switch 250. Also, the contacts 263 and 266 of switch 251 normally engage to short the "up" winding 244. The switch 202 is held open and the switches 201, 277 and 290 are normally open when the arm assembly 16 is in its rest position.

In order to move the arm assembly 16 downwardly from its rest position shown in FIGURE 1 to its weld position shown in FIGURE 2, the operator actuates the "down" switch 251 by depressing the carrier 262 to effect engagement of contacts 264 and 267. This is effective to open the "up" winding 244 and since the "down" winding 243 is shorted by switch 250 and also now by switch 251, the motor shaft 154 rotates in a counterclockwise direction as viewed in FIGURE 9 to displace the stirrup 165 downwardly to effect pivotal movement of arm assembly 16 in a counterclockwise direction. As the bearing 156 rotates in a counterclockwise direction, the operating member 210 of switch 200 is released to open contacts 286 and 287 which opens one shorting circuit for the "down" winding 243. However, this winding remains shorted by continued depression of the carrier 262 of the switch 251, and as long as carrier 262 of switch 251 is held in its down position, the arm assembly 16 pivots downwardly towards its weld position.

When the arm assembly 16 arrives at its weld position shown in FIGURE 2, the flat springs are deflected upwardly as viewed in FIGURE 6 and such upward deflection of the lower flat spring 80 and the plate 225 permits the movable contact 221 of "arm" switch 202 to elevate and close the contacts 220 and 221 which effects energization of coil 295 to displace the armature 294 downwardly which results in engagement of the contacts of switches 277 and 290. Closure of switch 290 results in energization of the lamp 291 which indicates that a weld can be performed at this time. Closure of switch 277 shorts the "up" winding 244 and since the "down" winding 243 is still shorted by the switch 250, the rotation of the motor is terminated very quickly by dynamic braking. The operator now releases the carrier 262 of switch 251 which returns to its normal illustrated position by compression of the spring 268. The weld operation is now performed, either manually by closure of switch 139 or automatically after a short delay in response to closure of the switch 202, for example. The switch 202 is normally employed to determine the "down" stop and the switch 201 is utilized to stop the motor if no work is in position so as to prevent damage to the welding device.

When the welding operation is completed, the arm assembly 16 is elevated to its rest position. This is accomplished by the operator depressing the carrier 253 of switch 250 to close the contacts 255 and 258 which opens the "down" winding 243. Since the "up" winding 244 is at this time shorted by both the switches 251 and 277, the motor is rotated in a direction to elevate the arm assembly 16. Such elevation results in opening of switch 202 to deenergize the winding 295 which results in opening of switches 277 and 290. Opening of switch 290 is effective to extinguish the lamp 291. Opening of switch 277 opens one of the shorting circuits for the "up" winding 244. However, this winding remains shorted by continued depression of the carrier 253 of switch 250, and also by switch 251 which is in its normal position illustrated in FIGURE 11. When the bearing 156 has been rotated to a position wherein the bracket 212 closes switch 200, the "down" winding 243 becomes shorted and since the "up" winding 244 is also shorted at this time by both switches 250 and 251, rotation of the motor is very quickly stopped by dynamic braking and upward movement of the arm assembly 16 is terminated. The operator now releases the carrier 253 of switch 250 which returns to its normal position and establishes a shorting circuit for the "down" winding 243 in addition to that established by the now closed switch 200. The circuit is now in its original condition and is effective to cause downward movement of the arm assembly 16 in response to depression of the carrier 262 of switch 251 as previously described.

It is apparent from the above description of the circuit arrangement that the motor can be stopped very quickly to terminate movement of the arm assembly 16 in any position of its path of travel merely by the operator releasing the carrier of the actuated one of the switches 250 and 251. To illustrate this, assume that the carrier 262 of switch 251 is depressed and that the arm assembly 16 is moving from its rest position towards its weld position. At this time, the "down" winding 243 is shorted by the switch 250 in its normal illustrated position and the "up" winding 244 is opened by reason of the actuated condition of switch 251. If for some reason the operator wishes to stop the motor, he merely releases the carrier 262 which returns automatically to its normal position to short the "up" winding 244 and stop the motor. If desired, the motor can now be reversed merely by depressing the carrier 253 of switch 250 which shorts the "up" winding 244 and causes motor rotation in the direction to move the arm assembly 16 towards its rest position.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

I claim:
1. A welding device comprising electrode means adapted to contact a workpiece to be welded, support means movably supporting said electrode means for movement relative to said workpiece, said support means including elongated, cantilever, resiliently deflectable means connected to said electrode means, said resiliently deflectable means adapted to be deflected upon contact of said electrode means with the workpiece, means for moving said electrode means from a welding position wherein said electrode means is adapted to contact the workpiece to a remote rest position, preload means including an elongated flat spring operatively connected to said support means for forcefully urging said electrode means, in the rest position, toward the welding position, and preload adjustment means operatively connected to said support means engaging said spring intermediate its length for adjusting the force with which said spring urges said electrode means towards the welding position.

2. A welding device for welding a workpiece comprising base means, arm means operatively movably connected to said base means, said arm means including elongated, cantilever resiliently reflectable support means, electrode means adapted to engage a workpiece to weld the same, said electrode means mounted at one end of said deflectable support means, drive means for moving said arm means from a welding position to a remote rest position, an elongated flat spring operatively connected to said arm means for restraining movement of said electrode means away from said welding position, and adjustment means operatively connected to said arm means comprising a rotatable screw engaging said spring intermediate its length for adjusting the force with which said spring restrains movement of said electrode means away from said welding position.

3. A welding device for welding a workpiece comprising base means, carriage means vertically adjustably connected to said base means, arm means pivotally mounted on said carriage means, said arm means including elongated, cantilever resiliently deflectable support means, electrode means adapted to engage a workpiece to weld the same, said electrode means mounted at one end of said deflectable support means, drive means for pivoting said arm means from a weld position to a remote rest position, an elongated flat spring operatively connected to said arm means for restraining pivotal movement of said electrode means away from said welding position, and adjustment means operatively connected to said arm means engaging said spring intermediate its length for adjusting the force with which said spring restrains movement of said electrode means away from said welding position.

4. A welding device for welding a workpiece comprising base means, carriage means vertically adjustably connected to said base means, arm means pivotally mounted on said carriage means, adjustable set screw means pivotally connecting said arm means with said carriage means, said arm means including elongated, cantilever resiliently deflectable support means, electrode means adapted to engage a workpiece to weld the same, said electrode means mounted at one end to said deflectable support means, drive means for pivoting said arm means from weld position to remote rest position, an elongated flat spring operatively connected to said arm means from restraining pivotal movement of said electrode means away from said welding position, and adjustment means operatively connected to said arm means comprising second rotatable screw means engaging said spring intermediate its length for adjusting the force with which said spring restrains movement of said electrode means away from said welding position.

5. A welding device for welding a workpiece, the device comprising base means, carriage means vertically adjustably connected to said base means, arm means pivotally mounted on said carriage means, said arm means including electrically conductive resiliently deflectable support means, insulator means supporting said deflectable support means on the remainder of said arm means, electrode means adapted to contact a workpiece to weld the same, said electrode means mounted at one end of said deflectable support means, drive means for pivoting said arm means from a welding position to a remote rest position, spring means for restraining movement of said electrode means away from said welding position, adjustable means operatively connected to said arm means for adjusting the force with which said spring means restrains movement of said electrode means away from the welding position, and terminal means connected to said deflectable support means effective when energized to supply current to said electrode means through said deflectable support means.

6. A welding device for welding a workpiece comprising base means, carriage means vertically adjustably mounted on said base means, arm means pivotally mounted on one end thereof on said carriage means, said arm means including electrically conductive resiliently deflectable support means, insulator means supporting said deflectable support means on the remainder of said arm means, electrode means adapted to contact a workpiece to weld the same, said electrode means mounted at one end of said deflectable support means at another end of said arm means, drive means for pivoting said arm means from a welding position to a remote rest position, spring means for restraining movement of said electrode means away from said welding position, adjustable means operatively connected to said arm means for adjusting the force with which said spring means restrains movement of said electrode means away from the welding position, terminal means connected to said deflectable support means effective when energized to supply current to said electrode means through said deflectable support means, said drive means including a reversible electric motor, and means for controlling energization of said motor including a limit switch actuation of which is governed by deflection of said deflectable support means in response to contact by said electrode means with the workpiece.

7. A welding device for welding a workpiece comprising base means, arm means operatively pivotally connected to said base means, said arm means including a pair of resiliently deflectable elongated flat springs, electrode means adapted to engage a workpiece to weld the same, said electrode means mounted at one end of said flat springs, drive means for pivoting said arm means from a weld position to a remote rest position, an elongated flat control spring operatively connected to said arm means for restraining pivotal movement of said electrode means away from said welding position, and control spring adjustment means having micrometer type indicia thereon operatively connected to said arm means for adjusting the force with which said control spring restrains movement of said electrode means away from said welding position.

8. A welding device for welding a workpiece comprising base means, carriage means vertically adjustably mounted on said base means, arm means pivotally mounted on one end thereof on said carriage means, said arm means including a pair of electrically conductive resiliently deflectable elongated flat springs, insulator means connecting one end of each of said flat springs to the remainder of said arm assembly, electrode means adapted to contact a workpiece, said electrode means having an insulator portion, said electrode means connected at one end of said flat springs, drive means for pivoting said arm means from a welding position to a remote rest position, an elongated flat control spring restraining movement of said electrode means away from said welding position, one end of said control spring connected to said arm assembly and another end of said control spring engaging said insulator portion of said electrode means, control spring adjustment means operatively connected to said arm means for adjusting the force with which said control spring restrains movement of said electrode means away from the welding position, stop means connected to said arm means limiting movement of said electrode means toward the weld position, and terminal means connected to said deflectable support means effective when energized to supply current to said electrode means through said deflectable support means.

9. A welding device comprising a base, a pair of vertically extending posts adjacent one end of said base, a generally rectangular carriage including a space in the center thereof, a plurality of spaced, bored, sleeves mounted on said carriage, said sleeves slidably receiving said post, an adjustment screw having a lower end rotatably mounted on said base and an upper end threadedly received in a vertically disposed bore in a lower end of said carriage, a nut mounted on said screw, a coil spring about said screw and interposed between said nut and said lower end of said carriage, a bifurcated yoke including diverging inner legs, each inner leg having a recess in an outboard face thereof adjacent the inner end thereof, a pair of axially aligned set screws threadedly mounted in horizontally disposed bores in said carriage, each of said set screws having smooth, tapered inner ends rotatably received in said recesses in said inner legs, said yoke including an outer center leg, an arm assembly including a pair of spaced side plates, said center leg of said yoke fixedly connected between said side plates, a pair of vertically spaced, electrically conductive, flat springs positioned between said side plates, an insulator block connected between said side plates and supporting inner ends of said flat springs, an electrode assembly connected to outer ends of said flat springs, said electrode assembly including an insulator portion and a pair of electrode tips, each of said tips being electrically connected to one of said flat springs, an elongated, flat control spring positioned above said flat springs between said side plates, bracket means supporting an inner end of said control spring on said arm assembly, an outer end of said control spring engaging said insulator portion of said electrode assembly, a micrometer type of adjustment assembly connected to said arm assembly, said adjustment assembly including an adjustable screw means having indicia associated therewith, a lower end of said screw means engaging an upper face of said control spring intermediate the length thereof, drive means including a reversible electric motor, cam means drivingly connected to said motor, a U-shaped stirrup embracing said side plates, an upper end of said stirrup connected to said cam means, and means for controlling energization of said motor including a limit switch actuated in response to deflection of said flat springs when said electrode tips contact a workpiece.

10. A welding device comprising a base, a pair of vertically extending posts adjacent one end of said base, a generally rectangular carriage including a space in the center thereof, a plurality of spaced, bored, sleeves mounted on said carriage, said sleeves slidably receiving said posts, an adjustment screw having a lower end rotatably mounted on said base and an upper end threadedly received in a vertically disposed bore in the lower end of said carriage, a nut mounted on said screw, a coil spring about said screw and interposed between said nut and said lower end of said carriage, a bifurcated yoke including diverging inner legs, each inner leg having a recess in an outboard face thereof adjacent the inner end thereof, a pair of axially aligned set screws threadedly mounted in horizontally disposed bores in said carriage, each of said set screws having smooth tapered inner ends rotatably received in said recesses in said inner legs, said yoke including an outer center leg, an arm assembly including a pair of spaced side plates, said center leg of said yoke fixedly connected between said side plates, a pair of vertically spaced electrically conductive flat springs positioned between said side plates, an insulator block connected between said side plates and supporting the inner ends of said flat springs, an electrode assembly connected to outer ends of said flat springs, said electrode assembly including an insulator portion and a pair of electrode tips, each of said tips being electrically connected to one of said flat springs, an elongated, flat control spring positioned above said flat springs between said side plates, bracket means supporting an inner end of said control spring on said arm assembly, an outer end of said control spring engaging said insulator portion of said electrode assembly, a micrometer type adjustment assembly connected to said arm assembly, said adjustment assembly including an adjustable screw means having indicia associated therewith, a lower end of said screw means engaging an upper face of said control spring intermediate the length thereof, drive means including a reversible electric motor, said reversible electric motor effective when energized to move said electrode means between said rest and weld positions, said motor including a field winding and a pair of up and down windings, said motor being effective to move said electrode means toward said weld position when said field winding is energized, said down winding is shorted, and said up winding is open, and to move said electrode means towards said rest position when said field winding is energized, said up winding is shorted and said down winding is open, said motor being ineffective to move said electrode means when both of said up and down windings are shorted, an up limit switch connected across said down winding arranged to be closed to short said down winding when said electrode means is at its rest position, and arranged to be open to open said down winding when said electrode means is in any other position, a down limit switch connected across said up winding arranged to be closed to short said up winding when said electrode means is at its weld position, and arranged to be open to open said up winding when said electrode means is in any other position, a manually operable down control switch having a movable contact movable between first and second spaced fixed contacts, the movable contact of said down control switch normally engaging its first fixed contact and being movable into engagement with its second fixed contact to effect movement of said electrode means toward its weld position, said first fixed contact and said movable contact of said down control switch being connected across said up winding to short the up winding when engaged and to open the up winding when disengaged, said second fixed contact and said movable contact of said down control switch being connected across said down winding to short the down winding when engaged and to open the down winding when disengaged, and a manually operable up control switch having a movable contact movable between first and second spaced fixed contacts, the movable contact of said up control switch normally engaging its first fixed contact and being movable into engagement with its second fixed contact to effect movement of said electrode means towards its rest position, said first fixed contact and said movable contact of said up control switch being connected across said down winding to short the down winding when engaged and to open the down winding when disengaged, said second fixed contact and said movable contact of said up control switch being connected across said up winding to short the up winding when engaged and to open the up winding when disengaged, said flat springs being deflectable in response to engagement of said electrode tips with a workpiece to establish a follow up force which is applied to said electrode means during a welding operation, said down limit switch being held in an open position by said flat springs but positioned so as to open in response to deflection of said flat springs when said electrode tips engage a workpiece.

11. A welding device comprising base means, arm means operatively mounted on said base means for pivotal movement through a central plane of movement and about a transverse axis, electrode means connected to said arm means, drive means operatively mounted on said base means, rotatable eccentric means drivingly connected to said drive means, and connecting means connecting said eccentric means to said arm means for pivoting said arm means about said transverse axis from a welding position to a remote rest position, said connecting means movable by said eccentric means in a plane parallel to said central plane of movement of said arm means and a plane perpendicular thereto.

12. A welding device comprising base means, arm means operatively mounted on said base means for pivotal movement about a central plane of movement, electrode means connected to said arm means, drive means operatively mounted on said base means, rotatable eccentric means drivingly connected to said drive means, and connecting means connecting said eccentric means and said arm means for pivoting said arm means from a welding position to a remote rest position, said connecting means comprising stirrup means embracing said arm means, said stirrup means including vertical leg means, horizontal leg means connected to one end thereof, another end of said vertical leg means connected to said eccentric means, and deflectable means connected to said arm means, said deflectable means resiliently urging said horizontal leg means into contact with said arm means, said stirrup means movable by said eccentric means in a plane parallel to the central plane of movement of said arm means and in a plane perpendicular thereto.

13. A welding device for welding a workpiece, said device comprising a base means, arm means operatively pivotally connected to said base means, said arm means including elongated, cantilever resiliently deflectable support means, electrode means adapted to be engaged with a workpiece to weld the same, said electrode means mounted on one end of said deflectable support means, drive means for pivoting said arm means in a central plane of movement, rotatable eccentric means drivingly connected to said drive means, connecting means connecting said eccentric means with said arm means for pivoting said arm means from a welding position to a remote rest position, an elongated flat spring operatively connected to said arm means for restraining pivotal movement of said electrode means away from said welding position, adjustment means operatively connected to said arm means for adjusting the force with which said spring restrains movement of said electrode means away from said welding position, said connecting means movable by said eccentric means in a plane parallel to said central plate of movement of said arm means and in a plane perpendicular thereto.

14. A welding device for welding a workpiece, the device comprising base means, arm means operatively movably mounted on said base means, said arm means including resiliently deflectable support means, electrode means mounted on said deflectable support means and adapted to engage the workpiece, motor means operably connected to said base means for moving said arm means from a welding position to a remote rest position, said deflectable support means adapted to be deflected by engagement of said electrode means with the workpiece, switch means associated with said deflectable support means and mounted on said arm means, said switch means including an L-shaped member having a movable contact mounted thereon and a fixed contact normally spaced from said movable contact, said L-shaped member normally abutting deflectable support means, circuit means connecting said motor means with said switch means, said switch means normally maintained in an open position by said deflectable support means but biased to a closed position for interrupting motoring of said motor means responsive to engagement of said electrode means with the workpiece.

15. A welding device for welding a workpiece, the device comprising base means, arm means operatively pivotally mounted on said base means, said arm means including resiliently deflectable support means, electrode means mounted on said deflectable support means on one end thereof, said electrode means adapted to engage the workpiece, electric motor means operatively connected to said base means for pivoting said arm means from a welding position to a remote rest position, said deflectable support means adapted to be deflected by engagement of said electrode means with the workpiece, normally open switch means operatively associated with said deflectable support means, circuit means connecting said electric motor means to said switch means, said switch means including an L-shaped spring means biasing said switch to a closed position and abutment means on said L-shaped spring means abutting said deflectable support means when said arm is in the rest position to maintain said switch means in an open position whereby deflection of the deflectable support means by engagement of said electrode means with the workpiece permits said switch to close and interrupt motoring of said electric motor means.

16. A welding device for welding a workpiece comprising base means, arm means operatively pivotally connected to said base means, said arm means including elongated, cantilever resiliently deflectable support means, electrode means adapted to engage a workpiece to weld the same, said electrode means mounted on one end of said deflectable support means, electric motor means operatively connected to said base means for moving said arm means from a welding position to a remote rest position, said deflectable support means adapted to be deflected by engagement of said electrode means with the workpiece, an elongated flat spring operatively connected to said arm means for restraining pivotal movement of said electrode means away from said welding position, adjusting means operatively connected to said arm means for adjusting the force with which the spring restrains movement of said electrode means away from the welding position, switch means associated with said deflectable support means, said switch means normally maintained in an open condition but biased to a closed position for interrupting motoring of said electric motor means responsive to engagement of said electrode means with the workpiece.

References Cited
UNITED STATES PATENTS

| | | | |
|---|---|---|---|
| 2,214,760 | 9/1940 | Brown | 219—119 |
| 2,750,484 | 6/1956 | Ewald | 219—86 |
| 3,351,732 | 11/1967 | Adams | 219—86 |

RICHARD M. WOOD, *Primary Examiner.*

P. W. MAY, *Assistant Examiner.*